US009034210B2

(12) United States Patent
Ihle et al.

(10) Patent No.: US 9,034,210 B2
(45) Date of Patent: May 19, 2015

(54) FEEDSTOCK AND METHOD FOR PREPARING THE FEEDSTOCK

(75) Inventors: Jan Ihle, Deutschlandsberg (AT); Verena Fischer, Schwanberg (AT); Karin Hajek, Alfter (DE); Gerd Scheiwe, Rheinbach (DE); Thomas Haferkorn, Ingelheim (DE); Moritz V. Witzleben, Cologne (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 11/950,744

(22) Filed: Dec. 5, 2007

(65) Prior Publication Data
US 2009/0146116 A1   Jun. 11, 2009

(51) Int. Cl.
| H01L 29/12 | (2006.01) |
| H01B 1/12 | (2006.01) |
| H05B 3/14 | (2006.01) |
| C04B 35/468 | (2006.01) |
| C04B 35/634 | (2006.01) |
| B28B 1/24 | (2006.01) |

(52) U.S. Cl.
CPC . *H05B 3/141* (2013.01); *B28B 1/24* (2013.01); *C04B 35/468* (2013.01); *C04B 35/634* (2013.01); *H05B 2203/02* (2013.01)

(58) Field of Classification Search
USPC .............. 252/500, 62.63, 519, 519.3, 519.33, 252/520, 520.21
See application file for complete search history.

(56) References Cited

U.S. PATENT DOCUMENTS

| 3,761,203 A | 9/1973 | Neidhardt et al. |
| 4,189,509 A | 2/1980 | Hill |
| 4,189,700 A | 2/1980 | Hill |
| 4,325,341 A | 4/1982 | Yamauchi et al. |
| 4,713,524 A | 12/1987 | Leo et al. |
| 4,881,508 A | 11/1989 | Van Den Elst et al. |
| 4,898,142 A | 2/1990 | Van Wechem et al. |
| 5,062,573 A | 11/1991 | Makimura |
| 5,117,482 A | 5/1992 | Hauber |
| 5,218,943 A | 6/1993 | Takeda et al. |
| 5,219,811 A | 6/1993 | Enomoto et al. |
| 5,340,510 A | 8/1994 | Bowen |
| 5,361,990 A | 11/1994 | Pimentel |
| 5,400,969 A | 3/1995 | Keene |
| 5,409,165 A | 4/1995 | Carroll et al. |
| 5,498,855 A | 3/1996 | Deevi et al. |
| 5,508,677 A | 4/1996 | Neubert et al. |
| 5,551,400 A | 9/1996 | Rice et al. ............ 123/531 |
| 5,715,798 A | 2/1998 | Bacon et al. |
| 5,861,795 A | 1/1999 | Glatz-Reichenbach et al. |
| 5,934,252 A | 8/1999 | Hafner et al. ............ 123/468 |
| 6,144,286 A * | 11/2000 | Moos et al. ............ 338/22 R |
| 6,320,167 B1 | 11/2001 | Lindemann et al. |
| 6,340,015 B1 | 1/2002 | Benedikt et al. |
| 6,806,519 B2 | 10/2004 | Chu et al. |
| 2001/0052553 A1 | 12/2001 | Hokao |
| 2002/0131328 A1* | 9/2002 | Bowens et al. ............ 366/318 |
| 2003/0154591 A1 | 8/2003 | Strumpler et al. |
| 2003/0183210 A1 | 10/2003 | Guettler et al. |
| 2004/0028396 A1 | 2/2004 | Russegger |
| 2005/0079458 A1 | 4/2005 | Waronitza et al. |
| 2005/0140492 A1 | 6/2005 | Chu et al. |
| 2005/0173414 A1 | 8/2005 | Ishii et al. |

FOREIGN PATENT DOCUMENTS

| CN | 1036551 | 10/1989 |
| CN | 1113026 | 12/1995 |
| CN | 1748108 | 3/2006 |
| DE | 27 53 766 | 6/1979 |
| DE | 4041868 | 7/1992 |
| DE | 29 911 711 | 11/1999 |
| DE | 198 18 375 | 11/1999 |
| DE | 198 60 919 | 2/2000 |
| DE | 100 12 675 | 9/2001 |
| DE | 103 47 509 | 5/2005 |
| EP | 0 284 120 | 9/1988 |
| EP | 0 307 206 | 9/1988 |
| EP | 0415428 | * 3/1991 |
| EP | 0415482 | 3/1991 |
| EP | 0 415 428 | 6/1994 |
| EP | 0642140 | 8/1995 |
| EP | 0 809 262 | 11/1997 |
| EP | 0 852 292 | 7/1998 |
| GB | 1 486 945 | 9/1977 |
| GB | 2 097 778 | 11/1982 |
| JP | 59-144702 | 8/1984 |
| JP | 59-221451 | 12/1984 |
| JP | 60-071573 | 4/1985 |
| JP | 62-055887 | 4/1987 |
| JP | 01-066901 | 3/1989 |

(Continued)

OTHER PUBLICATIONS

Beebhas C. Mutsuddy et al. "Ceramic Injection Molding" Chapman & Hall, London 1995 ISBN 0412538105.
International Search Report and Written Opinion for corresponding application PCT/EP2008/066545.
Jayanthi S. et al. "Effect of Segregative Addivities on the Positive Temperature Coefficient in Resistance Characteristics of n-baTiO3 Ceramics" J. of Material Science: Mater Electron,, vol. 17, No. 11, Nov. 1, 2006 pp. 883-897.
Shut et al "PTCR-Ceramics Obtained of Barium Titanate Powders with Different Crystallinity" Apps of Ferroelectrics, 2006 15th IEEE Intl Symp. Nov. 21, 2007 pp. 1-4 XP 002517334.

(Continued)

*Primary Examiner* — Monique Peets
(74) *Attorney, Agent, or Firm* — Fish & Richardson P.C.

(57) ABSTRACT

A feedstock for injection molding includes a ceramic filler that is sinterable to produce a ceramic with a positive temperature coefficient of electrical resistance, a matrix for binding the ceramic filler, the matrix having a melting point lower than a melting point of the ceramic filler, and metallic impurities. A content of the metallic impurities in the feedstock is lower than 10 ppm.

7 Claims, 2 Drawing Sheets

(56) References Cited

FOREIGN PATENT DOCUMENTS

| | | |
|---|---|---|
| JP | 02-097461 | 4/1990 |
| JP | 03-088770 | 4/1991 |
| JP | 04-311001 | 11/1992 |
| JP | 04-366585 | 12/1992 |
| JP | 05-175007 | 7/1993 |
| JP | 06-031711 | 2/1994 |
| JP | 08-020121 | 3/1996 |
| JP | 08-078142 | 3/1996 |
| JP | 2558357 | 9/1996 |
| JP | 2000-247734 | 9/2000 |
| JP | 2000-286104 | 10/2000 |
| JP | 2001-181058 | 7/2001 |
| JP | 2003-181326 | 12/2001 |
| JP | 2003-293869 | 10/2003 |
| JP | 2004-162941 | 6/2004 |
| JP | 2005-286035 | 10/2005 |
| JP | 2005-337509 | 12/2005 |
| JP | 2006-038270 | 2/2006 |
| JP | 2007-513308 | 5/2007 |
| JP | 07-246328 | 9/2007 |
| JP | 2007-246328 | 9/2007 |
| RU | 2006645 | 1/1994 |
| RU | 2015407 | 6/1994 |
| RU | 2052150 | 1/1996 |
| RU | 2132480 | 6/1999 |
| RU | 2169056 | 6/2001 |
| RU | 2170848 | 7/2001 |
| RU | 2180707 | 3/2002 |
| RU | 2 297 112 | 4/2007 |
| SU | 961760 | 9/1982 |
| SU | 157618 | 5/1999 |
| WO | WO 03/076078 | 9/2003 |
| WO | 2004/076922 | 9/2004 |
| WO | WO 2004/105439 | 12/2004 |
| WO | WO2006/130938 | 12/2006 |

OTHER PUBLICATIONS

Wegmann M. et al "Rapid-Response Ceramic Thermistor Fibers" Proc of IEEE Sensors 2003, 2$^{nd}$ IEEE Intl Conf. on Sensors, Toronto Canada, Oct. 22-24, 2003, NY, vol. 1, Oct. 22, 2003 pp. 626-630 XP 010692337.
Office Action from related U.S. Appl. No. 11/950,666, dated May 18, 2010.
International Search Report and Written Opinion for International Application No. PCT/EP2008/066720, Mar. 17, 2009, 12 pages.
International Search Report and Written Opinion for International Application No. PCT/EP2008/066551, Feb. 24, 2009, 10 pages.
International Search Report and Written Opinion for International Application No. PCT/EP2008/066724, Mar. 17, 2009, 10 pages.
International Search Report and Written Opinion for International Application No. PCT/EP2008/066655, Apr. 7, 2009, 11 pages.
International Search Report and Written Opinion for International Application No. PCT/EP2008/066658, May 6, 2009, 11 pages.
U.S. Appl. No. 11/950,659, filed Dec. 5, 2007, including application as filed (including pending claims).
U.S. Appl. No. 11/950,666, filed Dec. 5, 2007, including application as filed (including pending claims).
U.S. Appl. No. 11/950,669, filed Dec. 5, 2007, including application as filed (including pending claims).
U.S. Appl. No. 11/950,738, filed Dec. 5, 2007, including application as filed (including pending claims).
U.S. Appl. No. 11/950,724, filed Dec. 5, 2007, including application as filed (including pending claims).
Authorized officer Thukhanh T. Nguyen, Final Office Action in U.S. Appl. No. 11/950,669 mailed Dec. 28, 2010, 7 pages.
Fish & Richardson, Request for Continued Examination and Response to Final Office Action in U.S. Appl. No. 11/950,669, filed Mar. 7, 2011, 9 pages.
Big Russian-English Polytechnic Dictionary—Translation of "casting under pressure" Moscow, Publishing House "ETS", 2:424, 1996.
Chinese Patent Office, Test of Second Office Action in CN Patent Application No. 2008801193633, dated Feb. 15, 2012, 7 pages.
Dobrovolsky, "Slip casting," Moscow, Metallurgy, 1977 (III), pp. 10-11, 6 pages.
Excerpt "casting under pressure,"[online][Retrieved on Nov. 30, 2011]; Retieved from the Internet URL:http://www.multitran.ru/e/m.exe, 1 page.
Excerpt "pressing in a form,"[online][Retrieved on Nov. 30, 2011]; Retieved from the Internet URL:http://www.multitran.ru/e/m.exe, 1 page.
Poltechnic Dictionary, "Injection Molding," ed. I.I. Artobolevsky, Moscow, Soviet Encyclopedia, p. 259, col. 1, 1976.
Russian Patent Office, Office Action (English Translation) in RU Patent Application No. 2010127238, dated Oct. 3, 2011, 10 pages.
Japanese Office Action, with English translation, dated Apr. 16, 2013 for corresponding JP application 2010-536420, 5 pages.
Examination Report, with English translation, dated May 14, 2013 received in corresponding JP application 2010-536431.
Examination Report, with English translation, dated Jun. 4, 2013 received in corresponding JP application 2010-536440.
Arguments and Suggestions Set Forth by Representative of the FIIP (with English Translation), Jul. 25, 2012, 20 pages.
Guzman, I.Y., "Chemical Technology of Ceramics" (with English Translation) Moscow, OOO RIF, Building Materials, 2003 (III), p. 353.
Chinese Office Action (English Translation), CN application No. 200880119364.4, mailed Aug. 31, 2012, 13 pages.
Russian Patent Office, Decision on Grant in RU Patent (with English Translation) Application No. 2010127238, mailed Aug. 17, 2012, 9 pages.
European Patent Office, Office Action in EP Patent Applicationa No. 08856408.3, dated Sep. 13, 2011, 5 pages.
European Patent Office, Office Action in EP Patent Applicationa No. 08858335.6, dated Sep. 13, 2011, 7 pages.
Haertling, "Ferroelectric Ceramics: History and Technology," Journal of the American Ceramic Society, 82(4):797-818 (1999).
State Intellectual Property Office, P.R. China, Chinese Office Action in CH Patent Application No. 200880119387.5, mailed Jul. 26, 2011, 6 pages.
Szabo, "Improvements in Thermal Hard-Coating Technology," Industrial Heating 68(10):97-100 (2001).
Dobrovolsky, A.G. et al, "Machinery," Moscow: Machinostroenie, 1972, p. 82, para. 8 (English translation included).
Russian Patent Office, Official Action (with English Translation) in RU Patent Application No. 2010127360, mailed Nov. 22, 2012, 15 pages.
Russian Patent Office, Decision on Grant in RU Patent Application No. 201027352, mailed Jul. 28, 2011, 5 pages.
Russian Patent Office, Decision on Grant in RU Patent Application No. 20102735, mailed 2011, 3 pages.
Response to Office Action from related U.S. Appl. No. 11/950,666, filed Aug. 12, 2010.
Office Action from related U.S. Appl. No. 11/950,738, dated Jun. 14, 2010.
Japanese Office Action, with English translation, Application No. 2010-536441, mailed Jan. 22, 2013, 8 pages.
Japanese Office Action, with English translation, Application No. 2010-536430, mailed Jan. 29, 2013, 7 pages.
File History of U.S. Appl. No. 11/950,724 (downloaded from PAIR on Jan. 31, 2014).
Authorized officer Thukhanh T. Nguyen, Non-Final Office Action in U.S. Appl. No. 11/950,669, mailed Apr. 29, 2011, 8 pages.
Dobrovolsky, "Slip casting," Moscow, Metallurgy, 1977 (III), pp. 107-108 and 193, 7 pages.
Dobrovolsky, "Slip casting," Moscow, Metallurgy, 1977, 6 pages.
Guzman, "Chemical technology of ceramics", Moscow, OOO RIF "Building Materials", 2003 (III), pp. 349-350, 5 pages.
Russian Patent Office, Decision on Grant in RU Patent Application No. 2010127230, mailed 2011, 3 pages.
Russian Patent Office, Official Action in RU Patent Application No. 2010127360, mailed Jul. 8, 2011, 4 pages.
Russian Patent Office, Official Action in RU Patent Application No. 2010127238, mailed Jun. 23, 2011, 3 pages.

(56) References Cited

OTHER PUBLICATIONS

State Intellectual Property Office, P.R. China, Chinese Office Action in CH Patent Application No. 200880119366.3, mailed May 25, 2011, 4 pages.
Chinese office action relating to corresponding application CN 2008801193521 dated Dec. 26, 2013, 23 pages.
Japanese office action relating to corresponding application JP 2010-536420, 4 pages.
File History of U.S. Appl. No. 11/950,659 (downloaded from PAIR on Feb. 3, 2014).
File History of U.S. Appl. No. 11/950,666 (downloaded from PAIR on Feb. 3, 2014).
File History of U.S. Appl. No. 11/950,669 (downloaded from PAIR on Feb. 3, 2014).
File History of U.S. Appl. No. 11/950,738 (downloaded from PAIR on Feb. 3, 2014).
File History of U.S. Appl. No. 13/160,633 (downloaded from PAIR on Feb. 3, 2014).
Response to Office Action from related U.S. Appl. No. 11/950,666, filed Aug. 12, 2010
Office Action from related U.S. Appl. No. 11/950,669, dated Jul. 21, 2010.
Office Action from related U.S. Appl. No. 11/950,738, dated Jun. 14, 2010
Response to Office Action from related U.S. Appl. No. 11/950,738, filed Sep. 7, 2010.
Office Action from related U.S. Appl. No. 11/950,738, dated Sep. 23, 2010.
Japanese office action relating to corresponding application JP 2010-536440, 6 pages.
File History of U.S. Appl. No. 11/950,724 (downloaded Feb. 3, 2015).

* cited by examiner

FEEDSTOCK AND METHOD FOR PREPARING THE FEEDSTOCK

CROSS-REFERENCE TO RELATED APPLICATIONS

The following patent applications, all of which were filed on the same day as this patent application, are hereby incorporated by reference into this patent application as if set forth herein in full: (1) U.S. patent application Ser. No. 11/950,724, entitled "Injection Molded PTC-Ceramics", Application Ref. P2007,1179USE; (2) U.S. patent application Ser. No. 11/950,738, entitled "PTC-Resistor", Application Ref. P2007,1184USE; (3) U.S. patent application Ser. No. 11/950,659, entitled "Process For Heating A Fluid And An Injection Molded Molding", Application Ref. P2007,1182USE; (4) U.S. patent application Ser. No. 11/950,666, entitled "Injection Molded Nozzle And Injector And Injector Comprising The Injection Molded Nozzle", Application Ref. P2007,1183USE; and (5) U.S. patent application Ser. No. 11/950,669, entitled "Mold Comprising PTC-Ceramic", Application Ref. P2007,1181USE.

TECHNICAL FIELD

This disclosure relates to feedstocks for PTC-ceramics that can be processed into bodies of complex geometries.

BACKGROUND

Ceramic materials with a positive temperature coefficient of their electrical resistance (PTC-ceramics) may be processed into molded bodies. With conventional methods such as continuous casting or extrusion, bodies of simple geometries like discs or rectangles can be formed.

SUMMARY

A feedstock for injection molding is provided. The feedstock comprises a ceramic filler convertible by sintering into a ceramic with a positive temperature coefficient of its electrical resistance (PTC-ceramic). The feedstock comprises a matrix for binding the filler, the matrix having a melting point lower than the melting point of the ceramic filler. Additionally, the feedstock comprises metallic impurities, the content of which in the feedstock is lower than 10 ppm (parts per million).

The feedstock is suited to producing bodies containing a PTC-ceramic by injection molding. The feedstock may be processed to create a high variety of injection molded bodies for a variety of applications where the features of PTC-ceramics are needed. The PTC-ceramic has a low resistivity at room temperature, in particular at 25° C. When plotting the resistance of such a PTC-ceramic against temperature in a so called resistance-temperature-curve, the resistance starts to increase at a certain characteristic reference temperature. At temperatures above this reference temperature the resistance of the ceramic shows a steep slope with increasing temperature. Thus, when applying a voltage to a body containing the PTC-ceramic, the body is heated. To maintain these electrical features of the PTC-ceramic, impurities, especially metallic impurities, may be reduced or avoided in the feedstock which is later processed into the PTC-ceramic.

A method for preparing a feedstock for injection molding is also proposed. The method comprises the preparation of a ceramic filler convertible by sintering to a PTC-ceramic. The ceramic filler is mixed with a matrix for binding the filler and the mixture comprising filler and matrix is processed into a granulate. During the preparation of the feedstock, tools contactable with the feedstock are used which have a low degree of abrasion such that a feedstock comprising less than 10 ppm of abrasion caused impurities is obtained.

The method enables preparing a feedstock with a low content of impurities. As a result of the at least nearly absent impurities, when the feedstock is injection molded, its electrical properties such as low resistivity and/or steep slope of the resistance-temperature curve are maintained in the molded ceramic body.

DETAILED DESCRIPTION

Figure 1:
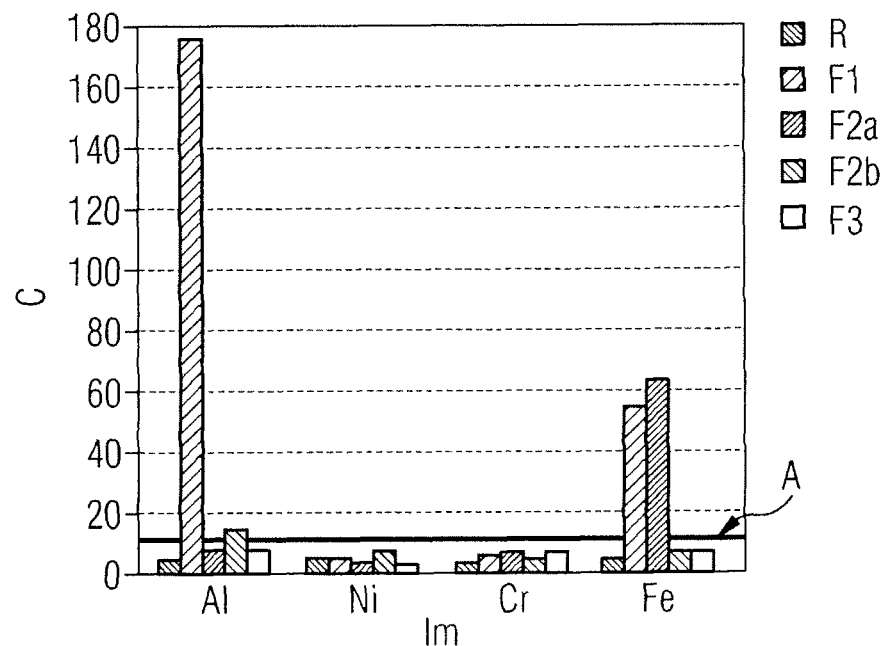
FIG. 1 shows the content of metallic impurities of differently prepared feedstocks.

One embodiment includes an injection moldable feedstock with a ceramic filler and a matrix for binding the filler. This embodiment includes less than 10 ppm of metallic impurities and comprises a ceramic filler based on Bariumtitanate ($BaTiO_3$), which is a ceramic of the perovskite-type ($ABO_3$) The ceramic comprises the structure

$$Ba_{1-x-y}M_xD_yTi_{1-a-b}N_aMn_bO_3$$

wherein the parameters may be defined as follows:
x=0 to 0.5;
y=0 to 0.01;
a=0 to 0.01 and
b=0 to 0.01.

In this structure M stands for a cation of the valency two, such as for example Ca, Sr or Pb, D stands for a donor of the valency three or four, for example Y, La or rare earth elements, and N stands for a cation of the valency five or six, for example Nb or Sb.

Hence, a high variety of ceramic materials can be used, whereby the composition of the ceramic may be chosen in dependence of the required electrical features of the later sintered ceramic.

The ceramic filler of the feedstock can be converted into a PTC-ceramic with low resistivity and a steep slope of the resistance-temperature curve.

The resistivity of a PTC-ceramic made from such a feedstock can comprise a range from 3 Ωcm to 30000 Ωcm at 25° C. in dependence of the composition of the ceramic filler used and the conditions under which the feedstock is sintered.

The reference temperature $T_b$ at which the resistance begins to increase comprises a range from −30° C. to 340° C. As higher amounts of impurities could impede the electrical features of the molded PTC-ceramic the content of the metallic impurities in the feedstock is lower than 10 ppm.

The feedstock is injection moldable since the melting point of the matrix is lower than the melting point of the ceramic filler. Thus, bodies of complex geometries can be produced by injection molding of the feedstock, for example bodies comprising bulges, protrusions, surface cavities or grooves or bodies comprising flanges or ribs.

According to one embodiment, the matrix in the feedstock comprises a content of ≤ 20 percent by mass, e.g., a content of ≤ 12 percent by mass. This content reduces costs and burnout time of the matrix when it is removed before or during sintering. Further, the low amount of matrix material in the feedstock helps control dimensional variations during the burnout and to reduce shrinkage of the feedstock while it is sintered.

The matrix may, according to one embodiment, comprise materials chosen out of a group comprising wax, resins, thermoplastics and water soluble polymers. For example, low molecular weight polyethylene, polystyrene, paraffin, microcrystalline waxes, several copolymers and celluloses may be contained in the matrix. Additionally, the matrix may comprise at least one more component chosen out of a group comprising lubricants, plasticizers and anti-oxidants. For example, phthalate plasticizers or stearic acids as lubricant may be contained in the matrix.

The metallic impurities in the feedstock may comprise Fe, Al, Ni, Cr and W. Their content in the feedstock, in combination with one another or each respectively, is less than 10 ppm due to abrasion from tools employed during the preparation of the feedstock.

A method for preparing a feedstock for injection molding is described, comprising the steps A) preparing a ceramic filler being convertible to PTC-ceramic by sintering, B) mixing the ceramic filler with a matrix for binding the filler, and C) producing a granulate comprising the filler and the matrix.

The method comprises using tools having such a low degree of abrasion that a feedstock comprising less than 10 ppm of impurities caused by said abrasion is prepared. Thus, preparation of injection moldable feedstocks with a low amount of abrasion caused metallic impurities is achieved without the loss of desired electrical features of the molded PTC-ceramic.

In step A) base materials of the filler can be mixed, calcinated and ground to a powder. During the calcination which can be performed at temperatures of about 1100° C. for around two hours a ceramic material of the structure $Ba_{1-x-y}M_xD_yTi_{1-a-b}N_aMn_bO_3$ with $x = 0$ to 0.5, $y = 0$ to 0.01, $a = 0$ to 0.01 and $b = 0$ to 0.01 is formed, where M stand for a cation of the valency two, D a donor of the valency three or four and N a cation of the valency five or six. This ceramic material is ground to a powder and dried to obtain the ceramic filler.

As base materials, $BaCO_3$, $TiO_2$, Mn-ion containing solutions and Y-ion containing solutions, for example $MnSO_4$ and $YO_{3/2}$, and at least one out of the group of $SiO_2$, $CaCO_3$, $SrCO_3$, and $Pb_3O_4$ may be used to prepare the ceramic filler. From these base materials a ceramic material of a composition such as $(Ba_{0.3290}Ca_{0.0505}Sr_{0.0969}Pb_{0.1306}Y_{0.005})(Ti_{0.502}Mn_{0.0007})O_{1.5045}$ can be prepared, for example. A sintered body of this ceramic material has a characteristic reference temperature $T_b$ of 122° C. and—depending on the conditions during sintering—a resistivity range from 40 to 200 Ωcm.

According to an implementation of the method, step B) is performed at a temperature of 40° C. to 200° C. First, the ceramic filler and the matrix are mixed at room temperature, after which this cold mixture is put into a hot mixer which is heated to temperatures of 100° C. to 200° C., e.g., between 120° C. to 170° C., for example 160° C. resulting in a mechanical mixing of the ceramic filler and the matrix. Then, the mixture of the ceramic filler and the matrix which binds the filler is homogenized in a twin-roll mill to a homogenous consistency at elevated temperatures of 40° C. to 160° C. Other kneading/crushing devices as mixer or mixing devices may be used.

A twin-roll mill may include two counter-rotating differential speed rollers with an adjustable nip and imposes intense shear stresses on the ceramic filler and the matrix as they pass through the nip. Further, a single-screw or a twin-screw extruder as well as a ball mill or a blade-type mixer may be used for preparing the mixture containing the matrix and the ceramic filler.

In step C), the mixture of matrix and ceramic filler can be cooled to room temperature and reduced to small pieces by crushing. In a further embodiment, the mixture of the matrix and the ceramic filler can be reduced to small pieces by cutting the mixture at elevated temperatures resulting from the heating applied in method step B). The mixture hardens when it is cooled and by reducing it to small pieces a granulate of feedstock material is formed.

According to an implementation of the method, the tools used in method steps A), B) and C) comprise coatings of a hard material. The coating may comprise any hard metal, such as, for example, tungsten carbide (WC). Such a coating reduces the degree of abrasion of the tools when in contact with the mixture of ceramic filler and matrix and enables the preparation of a feedstock with a low amount of metallic impurities caused by said abrasion. Metallic impurities may be Fe, but also Al, Ni or Cr. When the tools are coated with a hard coating such as WC, impurities of W may be introduced into the feedstock. However, these impurities have a content of less than 50 ppm. It was found that in this concentration, they do not influence the desired electrical features of the sintered PTC-ceramic.

The metallic impurities of the feedstock may be detected by chemical analyzing methods, for example by inductively coupled plasma (IPC) spectrometry. IPC-spectrometry is a technique for elemental analysis which is applicable to most elements over a wide range of concentrations. Most elements of the periodic table can be analyzed. Samples have to be dissolved prior to analysis.

FIG. 1 shows the content C (in ppm) of the metallic impurities Im including Al, Ni, Cr and Fe of differently prepared feedstocks, respectively.

Granulate R is a reference granulate prepared for dry pressing without homogenizing it under high shear rates. Thus, granulate R contains no or very few metallic impurities due to the preparation method without any abrasion of the tools.

Feedstock F1 was prepared for injection molding with tools made of steel which were not coated with any abrasion preventing coating.

Feedstocks 2a, 2b and 3 were prepared for injection molding with tools comprising surface coatings which prevent abrasion leading to metallic impurities. In the preparation of the feedstock F3, all tools were coated with the hard metal WC, whereas in the preparation of feedstocks F2a and F2b the tools were coated only partially such that the feedstock has been in contact with the steel of the tools during some method steps.

The reference granulate R has very low amounts of metallic impurities as it was not mixed with a matrix under high shear rates.

The feedstock F1 was prepared under high shear rates but without any coating of the tools used for mixing the ceramic filler with the matrix. It showed high amounts of Al (about 175 ppm) and Fe (about 55 ppm). The high content of Al was considered to arise from a cleaning step of the tools with $Al_2O_3$ before homogenizing the feedstock; the content of Fe was found to be caused by abrasion of the tools. The development of methods with a coating of WC on the surfaces of the tools reduces the amount of metallic impurities in the feedstock.

In feedstocks F2a, F2b and F3, almost all metallic impurities have a lower content of Fe than the content A (10 ppm), which is the highest allowable content for maintaining the desired electrical features of the later sintered PTC-ceramic. To avoid the use of $Al_2O_3$ for cleaning the tool and reducing the content of Aluminium (Al) in the feedstock, the tool may be cleaned with the same material as the material of the feedstock itself prior to preparing the injection moldable feedstock.

Figure 2:
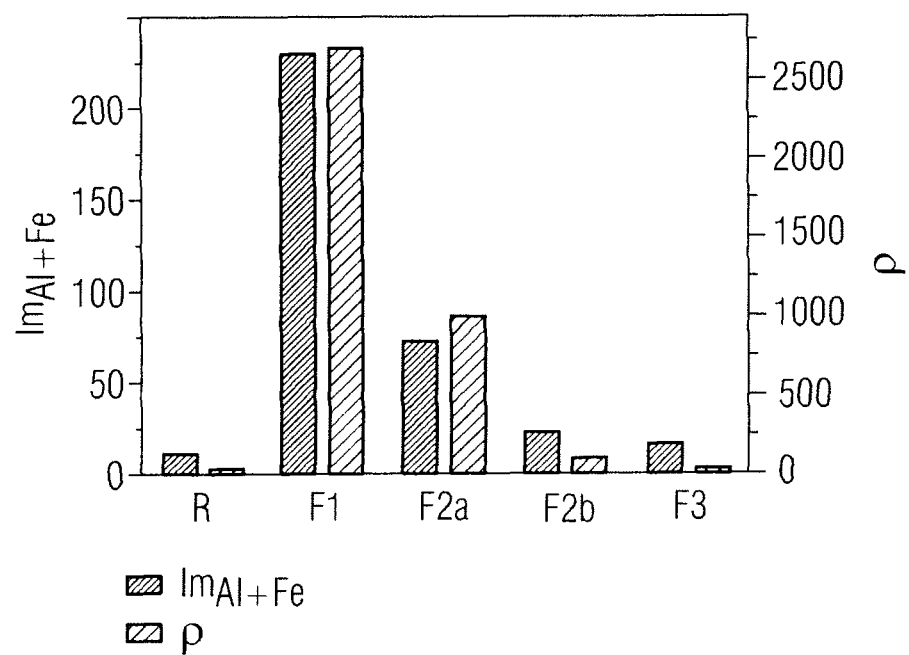
FIG. 2 shows the relation between metallic impurities and resistivities of injection molded bodies prepared from different feedstocks.

FIG. 2 shows the relation between metallic impurities of Al and Fe $Im_{Al+Fe}$ (in ppm) in a sintered PTC-ceramic and the resistivity ρ (in Ωcm) prepared from different feedstocks. The sintering of the feedstocks can be performed at temperatures of about 1250° C. to 1400° C., e.g., of about 1300° C. to 1350° C. in air. Temperature, cooling, pressure, atmosphere and the cooling rate during the sintering process can be varied to influence the characteristics of the PTC-ceramic.

FIG. 2 shows a clear relation between ρ and $Im_{Al+Fe}$. The higher the amount of the impurities, the higher is the resistivity of the sintered ceramic. Thus, feedstock F1 which was prepared without WC-coating of the surface of the tool or tools leads to a ceramic with a resistivity of more than 2500 Ωcm. In contrast, when the feedstock was prepared with a WC coating of the surface of the tools, such as with feedstocks F2b or F3, ρ of the sintered PTC-ceramic is about as low as in PTC-ceramics which are obtained by granulate prepared for dry pressing (granulate R).

Figure 3:
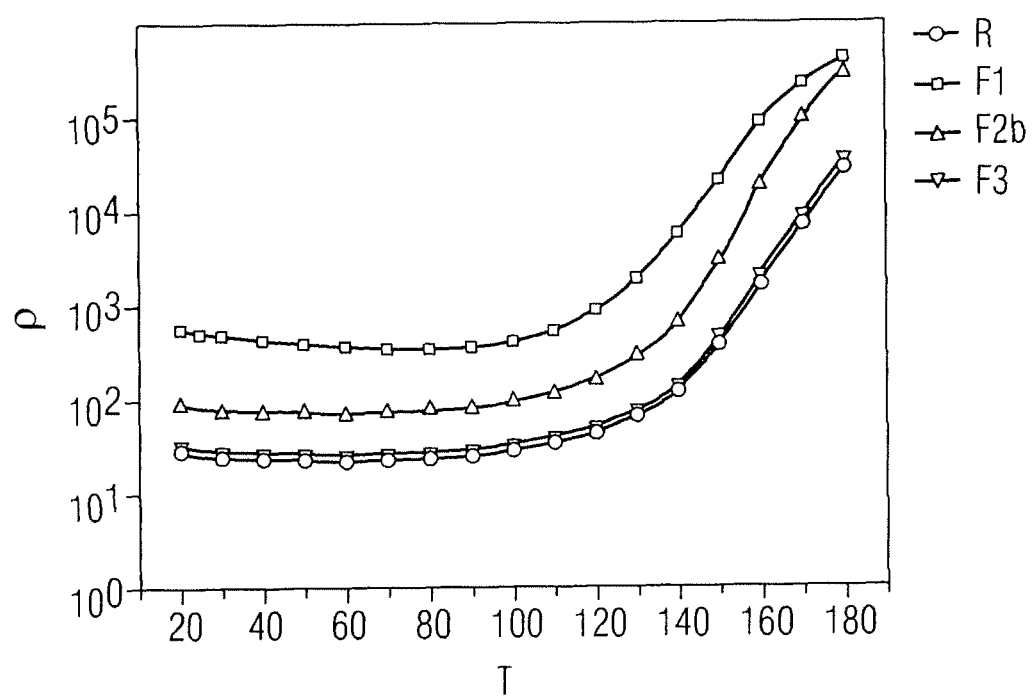
FIG. 3 shows resistance-temperature curves of molded bodies prepared from different feedstocks.

In FIG. 3, resistance-temperature curves of PTC-ceramics are shown whereby the resistivity ρ in Ωcm is plotted against the temperature T in ° C. The PTC-ceramic made of the reference granulate R by dry pressing has a low resistivity of 20 Ωcm for temperatures under 122° C. which is the characteristic reference temperature $T_b$. For temperatures above 122° C., a steep slope or derivative of the resistance with higher temperatures is shown. Such behaviour of the ceramic can also be achieved with an injection molded PTC-ceramic from a feedstock prepared with the above mentioned method (feedstock F3). For temperatures above the characteristic reference temperature $T_b$ (122° C. in this case), the resistance of the feedstock increases by about four orders of magnitude. Feedstocks with higher amounts of metallic impurities such as F1 or F2b have a higher resistivity at temperatures less than $T_b$ = 122° C. and the slope at temperatures above $T_b$ is flatter. This can be an undesired feature in applications making use of PTC-ceramics. The higher resistivity and reduced slope above $T_b$ was found to be due to abrasions during the preparation process of the respective feedstocks.

Thus, the presented feedstock enables the preparation of PTC-ceramics with desired electrical features and which can be processed by injection molding to a large variety of complex geometries. Further, the method of the preparation of a feedstock for injection molding leads to obtaining feedstocks with low amounts of impurities.

Other implementations are within the scope of the following claims. Elements of different implementations, including elements from applications incorporated herein by reference, may be combined to form implementations not specifically described herein.

What is claimed is:

1. A feedstock for injection molding, comprising:
   a ceramic filler that is sinterable to produce a ceramic having a positive temperature coefficient of electrical resistance and a reference temperature in a range from −30° C. to 340° C.;
   a matrix for binding the ceramic filler, the matrix having a melting point lower than a melting point of the ceramic filler; and
   metallic impurities caused by abrasion;
   wherein a content of the metallic impurities in the feedstock is lower than 10 ppm taken either individually or in combination, and wherein the metallic impurities comprise one or more of Fe, Al, Ni, or Cr.

2. The feedstock of claim 1, wherein the ceramic filler comprises a material with a structure:
   $Ba_{1-x-y}M_xD_yTi_{1-a-b}N_aMn_bO_3$, wherein
   x=0 to 0.5,
   y=0 to 0.01;
   a=0 to 0.01 and
   b=0 to 0.01;
   wherein M comprises a cation of the valency two, D comprises a donor of the valency three or four, and N comprises a cation of the valency five or six.

3. The feedstock of claim 1, wherein the ceramic comprises a resistivity of 3 Ωcm to 30000 Ωcm at 25° C.

4. The feedstock of claim 1, wherein a content of the matrix in the feedstock is less than or equal to 20 percent by mass.

5. The feedstock of claim 4, wherein the matrix comprises one or more of wax, resins, thermoplastics, or water soluble polymers.

6. The feedstock of claim 4, wherein the matrix comprises one or more of lubricants, plasticizers, or anti-oxidants.

7. The feedstock of claim 1, wherein the metallic impurities comprise two or more of Fe, Al, Ni, Cr, or W.

* * * * *